United States Patent
Smith

[19]

[11] Patent Number: 6,133,836
[45] Date of Patent: Oct. 17, 2000

[54] WIRELESS COMMUNICATION AND IDENTIFICATION PACKAGES, COMMUNICATION SYSTEMS, METHODS OF COMMUNICATING, AND METHODS OF FORMING A COMMUNICATION DEVICE

[75] Inventor: Freddie W. Smith, Boise, Id.

[73] Assignee: Micron Technology, Inc., Boise, Id.

[21] Appl. No.: 09/032,737

[22] Filed: Feb. 27, 1998

[51] Int. Cl.⁷ .................................................. G08B 13/14
[52] U.S. Cl. .................................. 340/572.7; 340/572.8; 343/700 MS
[58] Field of Search ............................ 340/572.7, 572.1, 340/572.8, 505, 825.54, 10.1; 343/700 MS, 702; 342/51; 235/492, 494

[56] References Cited

U.S. PATENT DOCUMENTS

| | | | |
|---|---|---|---|
| 4,075,632 | 2/1978 | Baldwin et al. | 343/6.8 |
| 4,926,182 | 5/1990 | Ohta et al. | 342/44 |
| 5,061,943 | 10/1991 | Rammos | 343/770 |
| 5,392,049 | 2/1995 | Gunnarsson | 343/51 X |
| 5,400,039 | 3/1995 | Akraki et al. | 343/700 MS |
| 5,410,749 | 4/1995 | Siwiak et al. | 343/700 MS X |
| 5,442,367 | 8/1995 | Naito et al. | 343/700 MS |
| 5,621,412 | 4/1997 | Sharpe et al. | 342/51 |
| 5,642,103 | 6/1997 | Tokuda et al. | 342/51 X |
| 5,649,296 | 7/1997 | MacLellan et aL. | 455/38.2 |
| 5,939,984 | 8/1999 | Brady et al. | 340/572.1 |

OTHER PUBLICATIONS

Kraus, John D., ANTENNAS Second Edition, McGraw–Hill, Inc., New York, 1988, pp. 460–477, 716–725.
U.S. application No. 08/914,305, to Ross Dando, filed Aug. 18, 1997.
U.S. application No. 08/926,595, to Mark Tuttle, filed Aug. 20, 1997.

*Primary Examiner*—Thomas Mullen
*Attorney, Agent, or Firm*—Wells, St. John, Roberts, Gregory & Matkin, P.S.

[57] ABSTRACT

The present invention provides wireless communication and identification packages, communication systems, methods of identifying an identification device, methods of communicating, and methods of forming a communication device. In one aspect of the present invention, a wireless communication package includes a communication device having a substrate; communication circuitry borne by the substrate, the communication circuitry being configured to at least one of process and form wireless communication signals; and at least one antenna electrically coupled with the communication circuitry, the antenna being configured to at least one of receive wireless communication signals and output wireless communication signals; and an appendage coupled with the communication device, the appendage being configured to enhance at least one of receiving and outputting of wireless communication signals via the antenna.

69 Claims, 4 Drawing Sheets

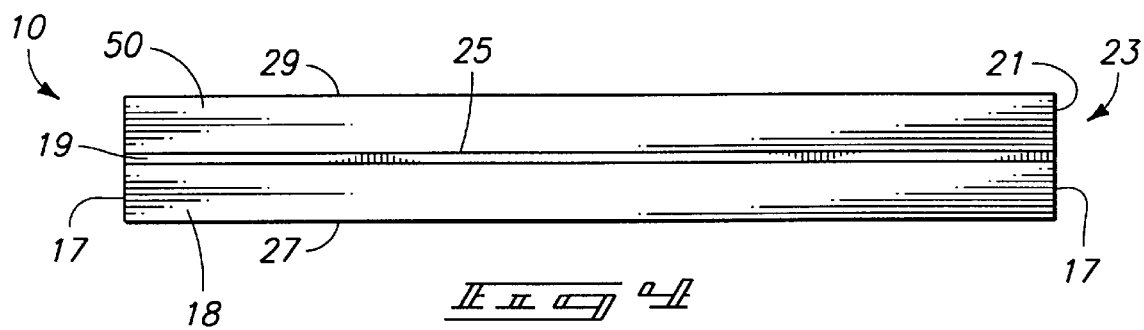
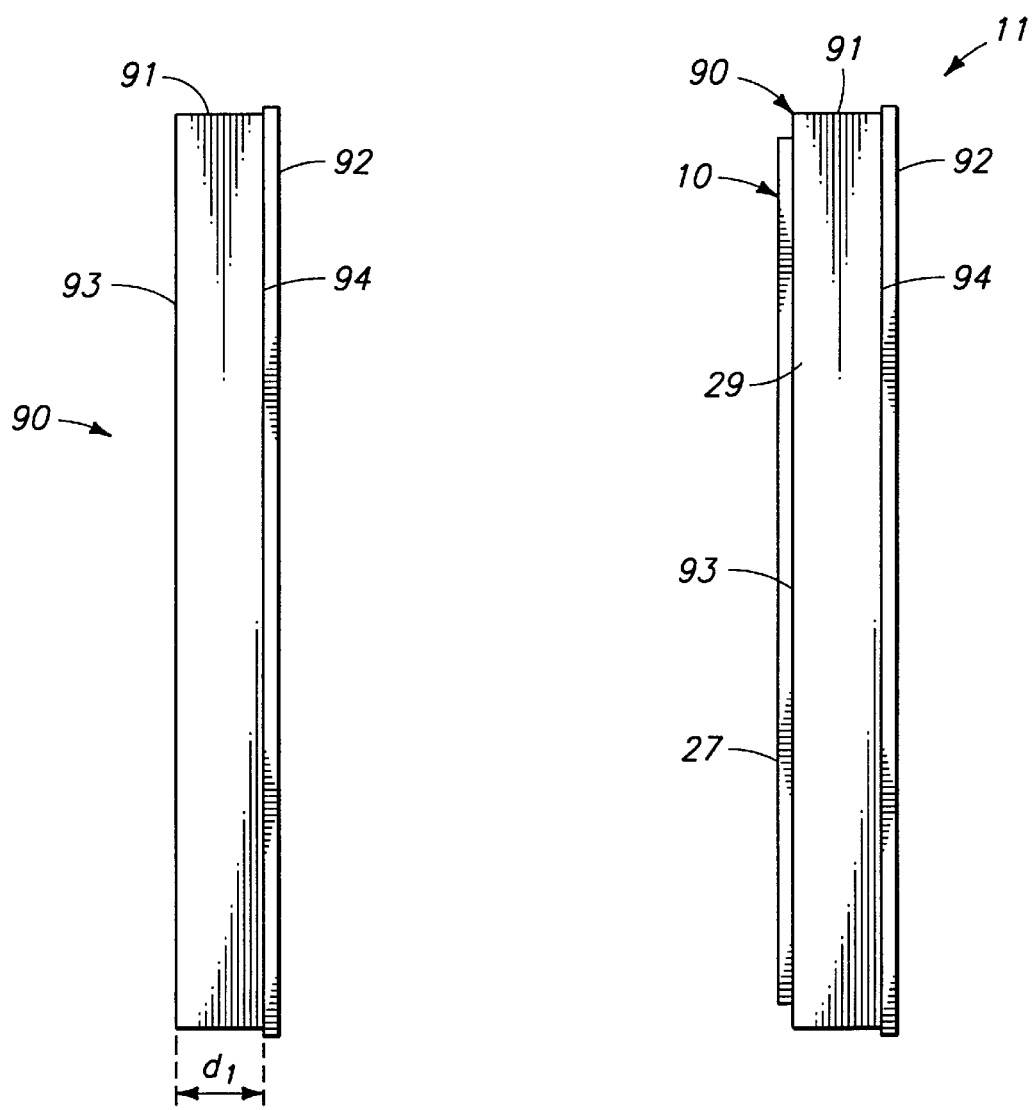

WIRELESS COMMUNICATION AND IDENTIFICATION PACKAGES, COMMUNICATION SYSTEMS, METHODS OF COMMUNICATING, AND METHODS OF FORMING A COMMUNICATION DEVICE

TECHNICAL FIELD

The present invention relates to wireless communication and identification packages, communication systems, methods of communicating, and methods of forming a communication device.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, assigned to the assignee of the present application and incorporated herein by reference. This application discloses the use of a radio frequency (RF) communication system including communication devices. The disclosed communication devices include an interrogator and a transponder, such as a tag or card.

Such communication systems can be used in various identification functions and other applications. The interrogator is configured to output a polling or interrogation signal which may comprise a radio frequency signal including a predefined code. The transponders of such a communication system are operable to transmit an identification signal responsive to receiving an appropriate polling or interrogation signal. More specifically, the appropriate transponders are configured to recognize the predefined code. The transponders receiving the code subsequently output a particular identification signal which is associated with the transmitting transponder. Following transmission of the polling signal, the interrogator is configured to receive identification signals enabling detection of the presence of corresponding transponders.

Such communication systems are useable in identification applications such as inventory or other object monitoring. For example, a remote identification device is attached to an object of interest. Responsive to receiving the appropriate polling signal, the identification device is equipped to output an identification signal. Generating the identification signal identifies the presence or location of the identification device and the article or object attached thereto.

It is preferred in most applications to maximize the communications range of the identification devices. Enabling communications at increased distances or ranges increases the number of applications for which the identification system may be utilized. Further, expanding the range of communications provides robust communications at decreased ranges.

SUMMARY OF THE INVENTION

In one aspect of the present invention, a wireless communication package is provided. The wireless communication package comprises a communication device and an appendage. The communication device includes a substrate and communication circuitry borne by the substrate. The communication circuitry is configured to at least one of process and form wireless communication signals. At least one antenna is electrically coupled with the communication circuitry and is configured to at least one of receive wireless communication signals and output wireless communication signals. The appendage is coupled with the communication device and is configured to enhance at least one of receiving and outputting of wireless communication signals via the antenna.

Another aspect of the invention provides a wireless identification package. The wireless identification package includes a housing and at least one antenna borne by the housing. The antenna is configured to at least one of receive wireless interrogation signals and output wireless identification signals. Communication circuitry is electrically coupled with the antenna and is configured to process received wireless interrogation signals and form wireless identification signals. An appendage is coupled with a surface of the housing. The appendage is configured to enhance at least one of receiving wireless interrogation signals and outputting wireless identification signals.

A communication system is provided in another aspect of the invention. The communication system includes an interrogator configured to output and receive wireless communication signals and a wireless communication package configured to communicate with the interrogator. The wireless communication package includes a communication device and an appendage configured to enhance wireless communications of the communication device.

The present invention also provides methods of communicating. Methods according to one aspect include steps of coupling an appendage with the identification device and increasing radio frequency energy of a wireless interrogation signal at the antenna using the appendage.

Methods of forming a wireless communication package are disclosed in another aspect of the invention. The methods of forming include steps of forming a housing and coupling an appendage configured to enhance wireless communications with the housing.

BRIEF DESCRIPTION OF THE DRAWINGS

Preferred embodiments of the invention are described below with reference to the following accompanying drawings.

FIG. 4 is an elevated end view of the communication device.

FIG. 5 is an elevated side view of an appendage according to the present invention.

FIG. 6 is an elevated side view of a communication package of the present invention.

DETAILED DESCRIPTION OF THE PREFERRED EMBODIMENTS

This disclosure of the invention is submitted in furtherance of the constitutional purposes of the U.S. Pat. Laws "to promote the progress of science and useful arts" (Article 1, Section 8).

This description of the present invention discloses embodiments of various wireless communication devices including wireless identification devices. The wireless communication devices are fabricated in card configurations (which include tags or stamps) according to first and second aspects of the present invention. Preferred communication devices of the described communication system are provided in housings. Different housings are utilized in different embodiments. An encapsulant forms a portion of the housing of the communication device described herein. Alternatively, a plastic shell or similar such housing is utilized.

The embodiments are illustrative and other configurations of wireless communication devices according to the present invention are possible. Certain embodiments of the wireless communication devices according to the invention comprise radio frequency identification devices (RFID) and remote intelligent communication devices (RIC). Remote intelligent communication devices are capable of functions other than the identifying function of radio frequency identification devices. A preferred embodiment of the remote intelligent communication device includes a processor.

Figure 1:
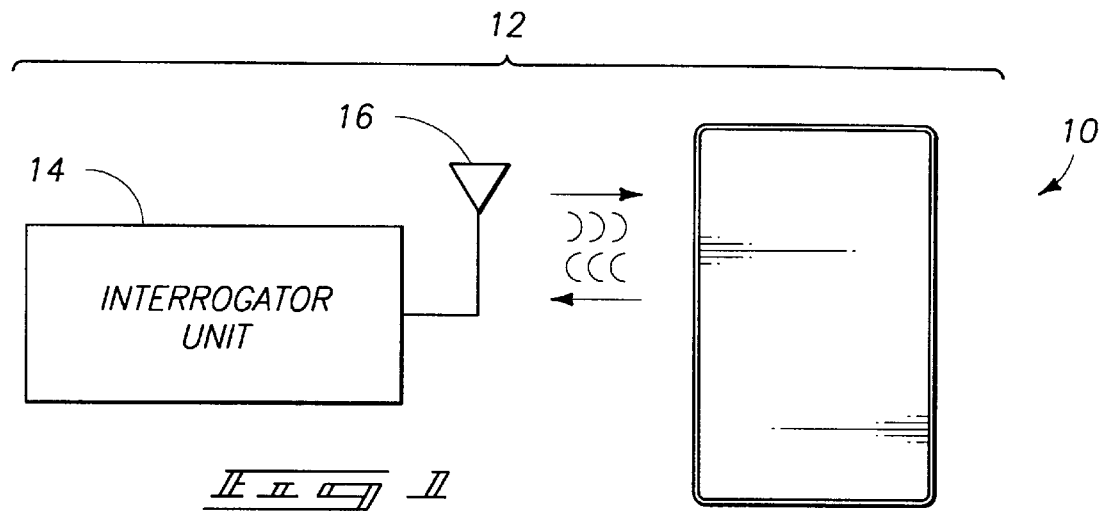
FIG. 1 is a diagrammatic representation of a communication system of the present invention.

Referring to FIG. 1, a wireless communication device 10 comprises part of a communication system 12. An exemplary communication system 12 is described in U.S. patent application Ser. No. 08/705,043, filed Aug. 29, 1996, assigned to the assignee of the present application and incorporated herein by reference. Communication system 12 further includes an interrogator unit 14. An exemplary interrogator 14 is described in detail in U.S. patent application Ser. No. 08/806,158, filed Feb. 25, 1997, now abandoned, assigned to the assignee of the present application and incorporated herein by reference.

Wireless communication device 10 communicates via wireless communication signals, such as radio frequency (RF) signals, with the interrogator unit 14. The wireless communication signals include wireless interrogation signals and wireless identification signals. Radio frequency signals including microwave signals are utilized for communications in a preferred embodiment of communication system 12. The communication system 12 includes an antenna 16 coupled to the interrogator unit 14.

Figure 2:
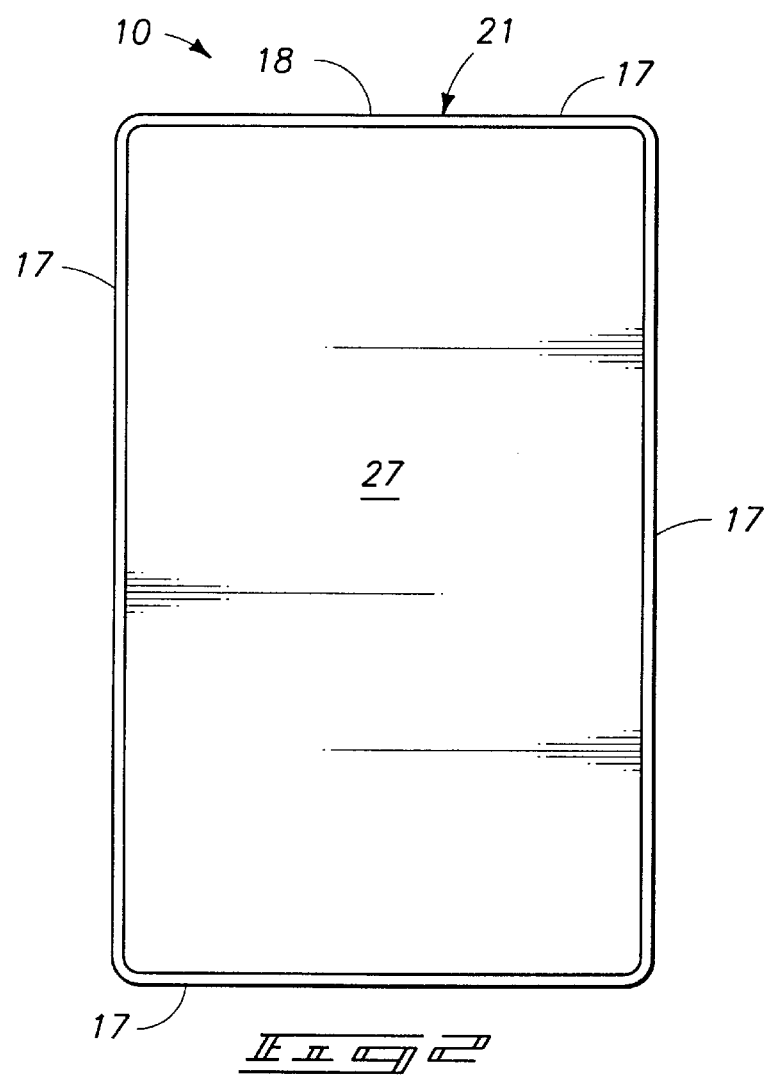
FIG. 2 is a top plan view of a communication device of the communication system.

Referring to FIG. 2, wireless communication device 10 includes an insulative substrate or layer of supportive material 18. The term "substrate" as used herein refers to any supporting or supportive structure, including but not limited to, a supportive single layer of material or multiple layer constructions. Example materials for the substrate 18 comprise polyester, polyethylene or polyimide film having a thickness of 4–6 mils (thousandths of an inch). Substrate 18 comprises a printed circuit board (PCB) in other embodiments of communication device 10.

In one embodiment, substrate 18 provides a first or lower portion of a housing for the wireless communication device 10 and defines an outer periphery 21 of the device 10. Periphery 21 of substrate 18 includes a plurality of peripheral edges 17. A first surface 27 of wireless communication device 10 is shown in FIG. 2. Communication device 10 also includes a second surface 29 (shown in FIG. 4) opposite first surface 27.

Figure 3:
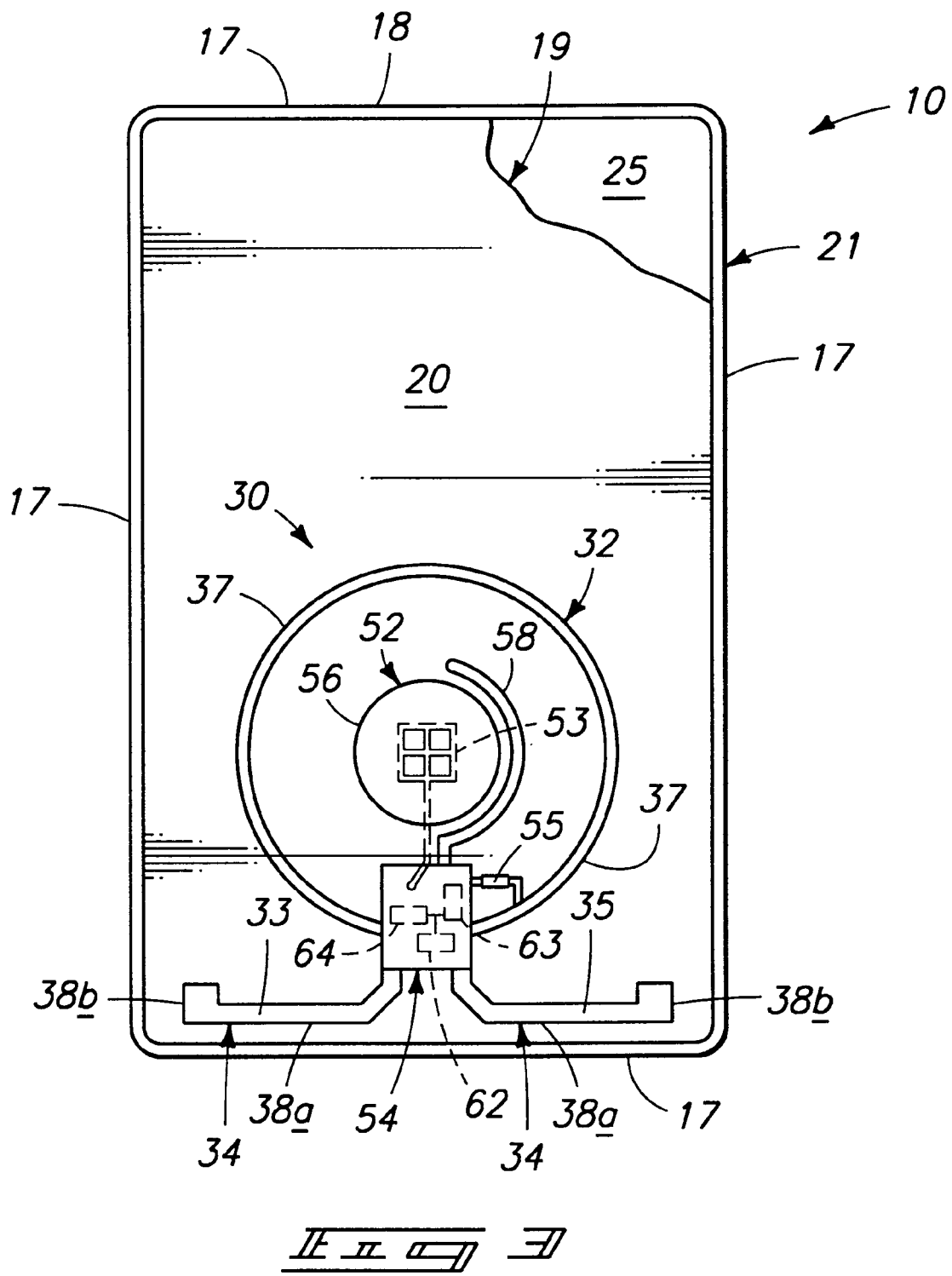
FIG. 3 is a top plan view of the communication device at an intermediate processing step.

Referring to FIG. 3, substrate 18 includes a support surface 25. At least one ink layer 119 is applied to support surface 25 of substrate 18 in a preferred embodiment of the invention. Ink layer 19 enhances the appearance of device 10. Ink 19 also conceals internal components and circuitry provided therein because substrate 18 comprises a clear substrate in some embodiments. A portion of ink layer 19 has been peeled away in FIG. 3 to reveal a portion of first surface 25 of substrate 18. In other embodiments, plural ink layers are provided upon first surface 25 of substrate 18.

A support surface 20 is provided to support components and wireless communication circuitry formed in later processing steps upon substrate 18. In embodiments wherein at least one ink layer 19 is provided, support surface 20 comprises an upper surface of ink layer 19 as shown in FIG. 3. Alternatively, first surface 25 of substrate 18 operates as the support surface 20 if ink is not applied to substrate 18.

A patterned conductive trace 30 is formed or applied over the substrate 18 and atop the support surface 20. Conductive trace 30 is formed upon ink layer 19, if present, or upon substrate 18 if no ink layer is provided. A preferred conductive trace 30 comprises printed polymer thick film (PTF). A suitable polymer thick film is EMCA REMEX P2607. An exemplary thickness of the polymer thick film is approximately 1 mil. The printed thick film comprises silver and polyester dissolved into a solvent. One manner of forming or applying the conductive trace 30 is to screen or stencil print the film on the support surface 20 through conventional screen printing techniques. The conductive trace 30 forms desired electrical connections with and between electronic components described below.

The illustrated conductive trace 30 includes a connection terminal 53 (shown in phantom in FIG. 3) and a connection terminal 58. Conductive trace 30 additionally defines antennas 32, 34 in one embodiment of the invention. Antennas 32, 34 are suitable for respectively receiving and outputting wireless signals or radio frequency energy. Antennas 32, 34 are also referred to as forward link and return link antennas, respectively. In the described embodiment, forward link communication refer to the communication of a wireless interrogation signal from interrogator 14 to at least one communication device 10. Return link communications refer to the communication of a wireless identification signal from a communication device 10 to interrogator 14.

In the illustrated embodiment, antenna 32 is a loop antenna having outer peripheral edges 37. Antenna 34 is formed as a dipole antenna constituting two elongated halves or portions 33, 35. Portions 33, 35 individually have horizontal peripheral edges 38a, which extend in opposing directions, and substantially parallel vertical peripheral edges 38b. Halves 33, 35 of antenna 34 have corresponding lengths appropriate for the desired transmission frequency. In the illustrated embodiment, halves 33, 35 of the dipole antenna 34 have respective sizes appropriate for 2.45 GHz communications. Both antennas 32, 34 including respective edges 37, 38 preferably extend or lie within the confines of peripheral edges 17 and outer periphery 21 of communication device 10.

Other antenna constructions are possible. In particular, both transmit and receive operations are implemented with a single antenna in alternative embodiments of the present invention.

One embodiment of wireless communication device 10 includes a power source 52, integrated circuit 54, and at least one capacitor 55. Power source 52, integrated circuit 54 and capacitor 55 are provided and mounted on support surface 20 and borne or supported by substrate 18 in the described embodiment. The depicted power source 52 is disposed within forward link antenna 32 of the illustrated wireless communication device 10. Capacitor 55 is electrically coupled with loop antenna 32 and integrated circuit 54 and assists with noise reduction in the described embodiment.

Power source 52 provides operational power to the wireless communication device 10 and selected components therein, including integrated circuit 54. In the illustrated embodiment, power source 52 comprises a battery. In particular, power source 52 is preferably a thin profile battery which includes first and second terminals of opposite polarity. More particularly, the battery has a lid or negative (i.e., ground) terminal or electrode, and a can or positive (i.e., power) terminal or electrode.

Conductive epoxy is applied over desired areas of support surface 20 using conventional printing techniques, such as stencil or screen printing, to assist in component attachment described below. Alternatively, solder or another conductive material is employed instead of conductive epoxy. Power source 52 is provided and mounted on support surface 20 using the conductive epoxy. Integrated circuit 54 and capacitor 55 are also provided and mounted or conductively bonded on the support surface 20 using the conductive epoxy. Integrated circuit 54 can be mounted either before or after the power source 52 is mounted on the support surface 20.

One embodiment of integrated circuit 54 includes suitable communication circuitry for providing wireless communications capabilities within electronic communication device 10. For example, in one embodiment, communication circuitry of integrated circuit 54 includes a microprocessor 62, memory 63, and transponder circuitry 64 (components 62, 63, 64 are shown in phantom in FIG. 3) in cooperation with one another for providing wireless communications with interrogator unit 14. An exemplary and preferred integrated circuit 54 is described in U.S. patent application Ser. No. 08/705,043 incorporated by reference above.

One embodiment of the communication circuitry including transponder circuitry 64 includes a modulator, such as a transmitter, and a receiver individually operable to respectively communicate (i.e., output) and receive wireless electronic signals. The microprocessor 62 is coupled with transponder circuitry 64 and is configured to process received forward link wireless communication signals. Responsive to the processing and detection of an appropriate polling signal within the forward link signals, microprocessor 62 forms a wireless identification return link signal. Microprocessor 62 instructs the modulator of transponder circuitry 64 to output the identification signal. The wireless communication signals are communicated via antennas 32, 34 in the illustrated embodiment.

The receiver of transponder circuitry 64 is configured to receive electromagnetic signals (e.g., in a wireless fashion) and the modulator is configured to output or communicate electromagnetic signals (e.g., in a wireless fashion). The modulator comprises either an active transmitter or a backscatter device, or both, according to certain embodiments. Such outputting or communicating of the wireless signals via the modulator comprises one of transmitting wireless signals and reflecting received signals. Typically, the modulator is configured to as communicate a wireless identification signal responsive to the reception of an appropriate wireless interrogation or polling wireless signal. The wireless identification signal outputted via the modulator identifies the particular device 10 communicating the identification signal in one embodiment.

Connection terminals 53, 58 are coupled to the integrated circuit 54 by conductive epoxy in accordance with a preferred embodiment of the invention. The conductive epoxy also electrically connects the first terminal of the power source 52 to the first connection terminal 53. In the illustrated embodiment, power source 52 is placed lid (i.e., negative terminal) down such that the conductive epoxy makes electrical contact between the negative terminal of power source 52 and first connection terminal 53.

Power source 52 has a perimetral edge 56, which defines the second power source terminal, and is provided adjacent second connection terminal 58. In the illustrated embodiment, perimetral edge 56 of the power source 52 is cylindrical and connection terminal 58 is arcuate. Connection terminal 58 has a radius slightly greater than the radius of the power source 52 so that connection terminal 58 is closely spaced apart from the edge 56 of power source 52. In the illustrated embodiment, perimetral edge 56 defines the can of the power source 52. Edge 56 forms the positive contact or terminal of power source 52.

Subsequently, conductive epoxy is dispensed relative to perimetral edge 56 and electrically connects perimetral edge 56 with connection terminal 58. The conductive epoxy connects the positive terminal of the power source 52 to connection terminal 58. The conductive epoxy is then cured.

Referring to FIG. 4, an encapsulant 50, such as an encapsulating epoxy resin material, is subsequently formed to encapsulate a portion of the substrate 18. In one embodiment, resin encapsulant 50 is provided about and covers power source 52, integrated circuit 54 and conductive trace 30.

An exemplary resin encapsulant 50 is a flowable encapsulant. The flowable encapsulant 50 is flowed to encapsulate substrate 18. Encapsulant 50 is subsequently cured following the appropriate covering of power source 52, integrated circuit 54, conductive circuitry 30, and support surface 20 of substrate 18.

In the exemplary embodiment, such epoxy encapsulant 50 constitutes a two-part epoxy having a resin and a hardener which are sufficient to provide a desired degree of flexible rigidity. Further details regarding encapsulation of communication device 10 are described in U.S. patent application Ser. No. 08/800,037, filed Feb. 13, 1997, now U.S. Pat. No. 5,988,510, assigned to the assignee of the present application, and incorporated herein by reference.

In the described embodiment, the encapsulant 50, when cured, forms a composite substrate or solid housing 23 of communication device 10 which includes substrate 18 and encapsulant 50. The housing comprises a separate structure or shell configured to enclose the internal components (antennas 32, 34, power source 52 and integrated circuit 54) in alternative embodiments. The housing may comprise plastic in such alternative embodiments.

Substrate 18 defines first surface 27 of communication device 10 and encapsulant 50 defines a second surface 29 of communication device 10. In one embodiment, housing 23 of communication device 10 has a length of about 3.375 inches, a width of about 2.125 inches, and a thickness less than or equal to about 0.009 inches.

Referring to FIG. 5, an embodiment of an appendage 90 according to the present invention is illustrated. Appendage 90 is configured to enhance wireless communications of communication device 10 and is also referred to as a wireless communication range enhancer or attachment. In particular, appendage 90 improves the range of wireless communications of communication device 10 with interrogator 14. In a preferred mode of operation, appendage 90 enhances wireless communications of communication device 10 by maximizing radio frequency energy at receive antenna 32 of device 10. Appendage 90 improves both forward link and return link wireless communications within communication system 12.

Utilization of appendage 90 improves the communications range of communication device 10 by approximately 70 percent. In an enhanced mode of operation, receive antenna 32 of communication device 10 has a gain of approximately 4–5 dB. When utilized in combination with appendage 90, receive antenna 32 has a gain of approximately 10–11 dB.

The illustrated appendage 90 includes a spacer 91 and conductive layer 92. Spacer 91 includes a first surface 93 and a second surface 94 opposite first surface 93. In one embodiment, spacer 91 comprises a material which does not absorb or reflect radio frequency energy within the communication band being utilized by communication system 12 (e.g., 915 MHz band or 2.45 GHz band in the described embodiment). Spacer 91 comprises STYROFOAM® available from the Dow Chemical Company in one embodiment. Spacer 91 is formed of other materials or polystyrenes in other embodiments.

Conductive layer 92 is configured in one embodiment to form a ground plane operable to reflect radio frequency energy and the wireless communication signals. Such reflection provides enhancement of the wireless communications of communications device 10. Both forward and return link communication signals are reflected by conductive layer 92 providing enhancement of both forward and return link communications.

A preferred conductive layer 92 comprises metal foil. The metal foil conductive layer 92 may comprise aluminum, gold, silver, copper or any other highly conductive metal. Conductive layer 92 comprises copper tape in the described embodiment. The copper tape has an adhesive side which is mounted to second surface 94 of spacer 91. Other adhesives are utilized to attach conductive layer 92 to spacer 91 to form appendage 90 in other embodiments.

Spacer 91 of the described appendage 90 has a predefined width $d_1$. Width $d_1$ is defined as the dimension intermediate first surface 93 and second surface 94. Dimension $d_1$ of spacer 91 directly affects the enhancement of appendage 90 upon the wireless communications of communication device 10. Dimension $d_1$ is one quarter the wavelength of the wireless communication signals in the described embodiment (i.e., approximately 3.2 inches for 915 MHz communications and about 1.2 inches for 2.45 GHz communications).

Referring to FIG. 6, appendage 90 is shown coupled or attached to communication device 10 to form a wireless communication package 11 in accordance with the present invention. Communication package 11 provides enhanced wireless communications compared with communications of device 10 alone. The wireless communication package 11 is configured as a wireless identification package in the described embodiment for communications with interrogator 14.

First surface 93 of spacer 91 is attached to the entire surface 29 of communication device 10 in the illustrated embodiment of communication package 11. Attachment of spacer 91 with communication device 10 is implemented by a spray adhesive in the described embodiment. Other attachment devices or methods are utilized in other embodiments of the invention. Preferably, adhesives are utilized which do not absorb or reflect radio frequency energy in the appropriate bands utilized for wireless communications within communication system 12.

Wireless communication signals (e.g., radio frequency signals) are reflected by conductive layer 92. Separating conductive layer 92 from communication device 10 by dimension $d_1$ adjusts the position of communication device 10 such that incident and reflected wireless communication signals add in phase at antennas 32, 34 of communication device 10. Utilization of appendage 90 with communication device 10 approximately doubles the electric field of the wireless communication signals.

Figure 7:
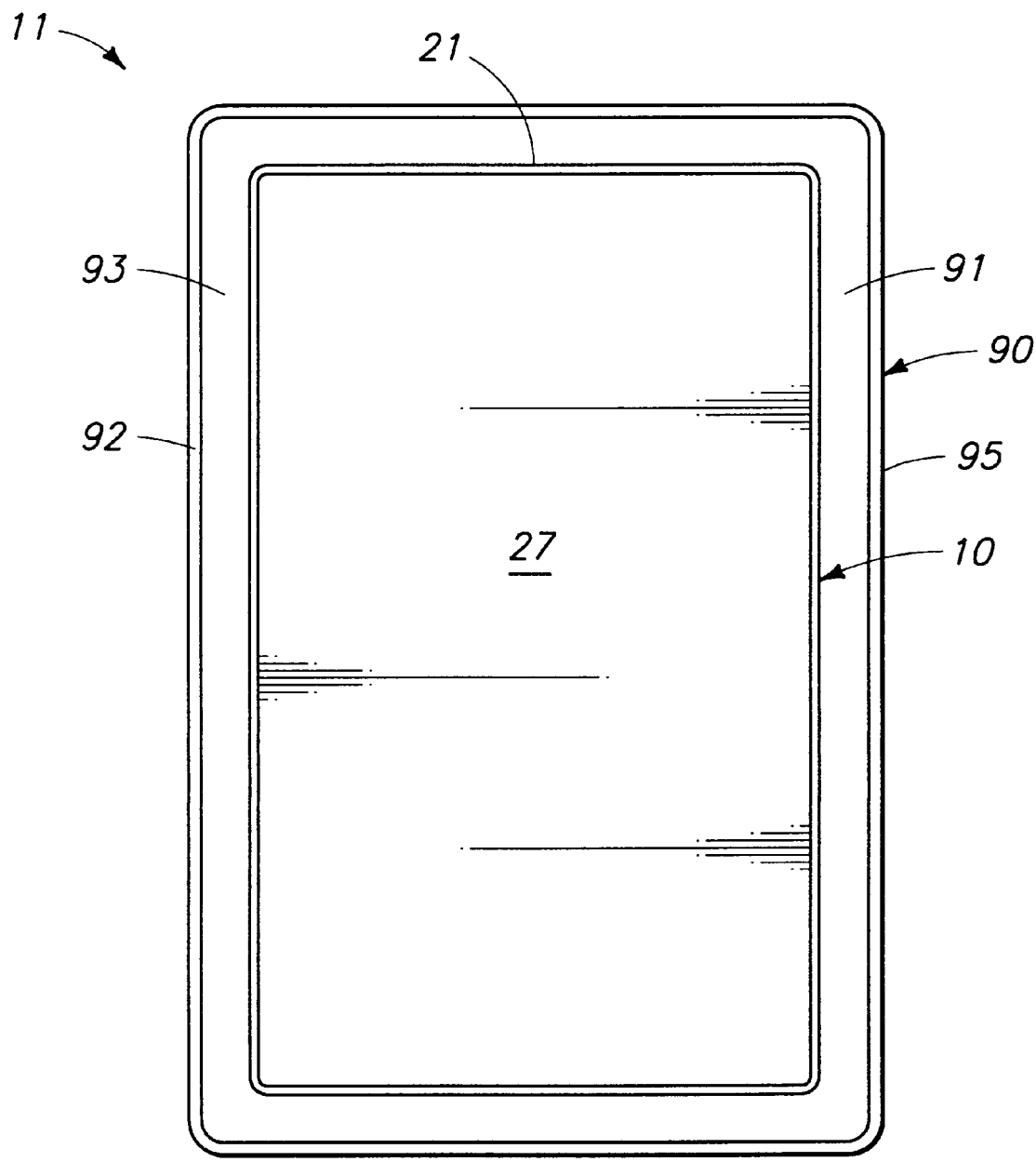
FIG. 7 is a top plan view of the communication package.

Referring to FIG. 7, a front plan view of communication package 11 is shown. Conductive layer 92 and appendage 90 include an outer periphery 95 which defines the surface area of conductive layer 92. In a preferred embodiment of the invention, conductive layer 92 has an area greater than the respective areas of spacer 91 and first surface 27 of communication device 10. The illustrated spacer 91 provides a somewhat larger surface area than the surface area of surface 27 of communication device 10. Communication device 10, including antennas 32, 34, are received within the confines of periphery 95 of conductive layer 92 in the illustrated embodiment.

In addition to enhancing wireless communications of device 10, appendage 90 affects or controls the directivity of device 10. The directivity of communication device 10 is focused outward from surface 27 of device 10 at an angle normal to surface 27 in the described embodiment. Other configurations (not shown) of communication package 11 may be arranged to further alter the directivity of communication device 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wireless communication package comprising:
   a communication device including:
      a substrate;
      communication circuitry borne by the substrate, the communication circuitry being configured to at least one of process and form wireless communication signals; and
      at least one antenna electrically coupled with the communication circuitry, the antenna being configured to at least one of receive wireless communication signals and output wireless communication signals; and
   an appendage coupled with substantially an entire outer surface of the communication device, the appendage being configured to enhance at least one of receiving and outputting of wireless communication signals via the antenna.

2. The wireless communication package according to claim 1 wherein the communication device comprises a remote intelligent communication device.

3. The wireless communication package according to claim 1 wherein the communication device comprises a radio frequency identification device.

4. The wireless communication package according to claim 1 wherein the appendage comprises a spacer and a conductive layer.

5. The wireless communication package according to claim 4 wherein the conductive layer forms a ground plane.

6. The wireless communication package according to claim 4 wherein the conductive layer includes an outer periphery, and the antenna includes a peripheral edge received within the confines of the outer periphery of the conductive layer.

7. The wireless communication package according to claim 4 wherein the spacer has a width of approximately one quarter the wavelength of the wireless communication signals.

8. The wireless communication package according to claim 1 wherein the appendage is configured to reflect radio frequency energy of the wireless communication signals toward the antenna.

9. The wireless communication package according to claim 1 wherein the communication device further comprises a housing.

10. The wireless communication package according to claim 9 wherein the appendage is coupled with the housing.

11. The wireless communication package according to claim 9 wherein the housing comprises an encapsulant and the substrate.

12. The wireless communication package according to claim 9 wherein the appendage is coupled with an entire surface of the housing, and the area of a conductive layer of the appendage is larger than the attached surface of the housing.

13. The wireless communication package according to claim 1 wherein the at least one antenna includes a first antenna configured to receive wireless interrogation signals and a second antenna configured to output wireless identification signals.

14. A wireless identification package comprising:
   a housing;
   at least one antenna borne by the housing, the antenna being configured to at least one of receive wireless interrogation signals and output wireless identification signals;
   communication circuitry electrically coupled with the antenna, the communication circuitry being configured to process received wireless interrogation signals and form wireless identification signals; and
   an appendage coupled with a surface of the housing, the appendage being configured to enhance at least one of receiving wireless interrogation signals and outputting of wireless identification signals.

15. The wireless identification package according to claim 14 wherein the wireless communication package comprises a remote intelligent communication device.

16. The wireless identification package according to claim 14 wherein the wireless communication package comprises a radio frequency identification device.

17. The wireless identification package according to claim 14 wherein the appendage comprises a spacer and a conductive layer.

18. The wireless identification package according to claim 17 wherein the spacer has a thickness of approximately one quarter the wavelength of the wireless communication signals.

19. The wireless identification package according to claim 17 wherein the conductive layer comprises a ground plane configured to cover an entire surface of the housing.

20. The wireless identification package according to claim 19 wherein the area of the ground plane is greater than the area of the coupled surface of the housing.

21. The wireless identification package according to claim 14 wherein the appendage is configured to reflect radio frequency energy to increase radio frequency energy at the antenna.

22. The wireless identification package according to claim 14 wherein the housing comprises a substrate and an encapsulant.

23. The wireless identification package according to claim 14 wherein the at least one antenna includes a first antenna configured to receive wireless interrogation signals and a second antenna configured to output wireless identification signals.

24. The package of claim 14 wherein the appendage is coupled with substantially the entire surface of the housing.

25. A communication system comprising:
   an interrogator configured to output and receive wireless communication signals; and
   a wireless communication package configured to communicate with the interrogator, the wireless communication package including: a communication device including a housing, at least one antenna borne by the housing, the antenna being operable to at least one of output and receive wireless communication signals, and communication circuitry coupled with the antenna, the communication circuitry being configured to process received wireless communication signals and form wireless communication signals; and an appendage coupled with an external portion of the housing of the communication device, the appendage being configured to enhance wireless communications of the communication device.

26. The communication system according to claim 25 wherein the communication device comprises a remote intelligent communication device.

27. The communication system according to claim 25 wherein the communication device comprises a radio frequency identification device.

28. The communication system according to claim 25 wherein the appendage includes a spacer and a conductive layer.

29. The communication system according to claim 28 wherein the spacer has a width of approximately one quarter the wavelength of the wireless communication signals.

30. The communication system according to claim 25 wherein the appendage is configured to reflect radio frequency energy to increase radio frequency energy at the antenna.

31. The communication system according to claim 25 wherein the housing comprises a substrate and an encapsulant.

32. The system of claim 25 wherein the appendage is coupled with substantially an entire surface of the housing.

33. A communication system comprising:
   an interrogator configured to output wireless interrogation signals and receive wireless identification signals;
   a wireless communication package configured to receive the wireless interrogation signals from the interrogator and output wireless identification signals to the interrogator, the wireless communication package including:
   a communication device including:
      a housing;
      a first antenna borne by the housing, the first antenna being operable to receive wireless interrogation signals;
      a second antenna borne by the housing, the second antenna being operable to output wireless identification signals; and
      communication circuitry coupled with the first and second antennas, the communication circuitry being configured to process received wireless interrogation signals and form wireless identification signals responsive to the wireless interrogation signals; and
   an appendage coupled with an entire surface of the housing of the communication device and the appendage being configured to enhance wireless communications of the communication device, the appendage including:
      a spacer attached to the surface of the housing and having a width of approximately one quarter of the wavelength of the wireless interrogation signals and the wireless identification signals; and
      a ground plane attached to the spacer, the ground plane being configured to reflect the wireless interrogation signals and the wireless identification signals.

34. A method of communicating comprising:

providing an identification device;

coupling an appendage with substantially an entire outer surface of the identification device to increase radio frequency energy at an antenna of the identification device during communications;

outputting a wireless interrogation signal using an interrogator;

receiving the wireless interrogation within the identification device;

outputting a wireless identification signal using the identification device, the outputting being responsive to the receiving of the interrogation signal; and receiving the wireless identification signal using the interrogator.

35. The method according to claim 34 wherein the coupling comprises coupling an appendage having a spacer and a conductive layer with the identification device.

36. The method according to claim 34 wherein the coupling comprises coupling an appendage having a spacer and a conductive layer with the identification device, the spacer having a width of approximately one quarter the wavelength of the wireless interrogation and identification signals.

37. The method according to claim 34 wherein the increasing comprises reflecting the wireless interrogation signals toward the antenna.

38. The method according to claim 34 further comprising enhancing the outputting.

39. The method according to claim 34 further comprising enhancing the outputting comprising reflecting the wireless identification signals using the appendage.

40. A method of communicating comprising:

forming a communication device having a housing about at least one of communication circuitry and an antenna;

receiving wireless communication signals using the communication device;

outputting wireless communication signals using the communication device; and after the forming, coupling an appendage with the housing of the communication device to enhance at least one of the receiving and the outputting.

41. The method according to claim 40 wherein the coupling comprises coupling an appendage having a spacer and a conductive layer with the communication device.

42. The method according to claim 40 wherein the coupling comprises coupling an appendage having a spacer and a conductive layer with the communication device, the spacer having a width of approximately one quarter the wavelength of the wireless communication signals.

43. The method according to claim 40 wherein enhancing of the receiving comprises increasing radio frequency energy of received wireless communication signals at the antenna.

44. The method according to claim 40 wherein the enhancing comprises reflecting wireless communication signals.

45. The method according to claim 40 wherein the enhancing comprises reflecting wireless communication signals using a ground plane of the appendage.

46. The method of claim 40 wherein the coupling comprises coupling the appendage with substantially an entire surface of the housing.

47. A method of forming a wireless communication package comprising:

providing a substrate;

supporting an antenna using the substrate;

configuring the antenna to at least one of output and receive wireless communication signals;

electrically coupling wireless communication circuitry with the antenna;

forming a housing to house the antenna and the wireless communication circuitry; and after the forming coupling an appendage configured to enhance wireless communications with an external portion of the housing.

48. The method according to claim 47 comprises a method of forming a wireless communication package including a remote intelligent communication device.

49. The method according to claim 47 comprises a method of forming a wireless communication package including a radio frequency identification device.

50. The method according to claim 47 wherein the forming the housing comprises forming the housing about the antenna and wireless communication circuitry.

51. The method according to claim 47 wherein the forming the housing comprises encapsulating the communication circuitry, the antenna and a surface of the substrate.

52. The method according to claim 47 further comprising forming an appendage having a conductive layer and a spacer intermediate the housing and the conductive layer.

53. The method according to claim 47 further comprising configuring the appendage for reflecting wireless signals and increasing radio frequency energy at the antenna using the conductive layer.

54. The method according to claim 47 further comprising receiving an outer peripheral edge of the antenna within the confines of an outer periphery of the appendage.

55. The method of claim 47 wherein the coupling comprises coupling the appendage with substantially an entire surface of the housing.

56. A method of communicating comprising:

outputting a radio frequency interrogation signal using an interrogator;

receiving the radio frequency interrogation signal using a first antenna of a wireless identification device;

coupling an appendage having a ground plane and a spacer with a housing of the wireless identification device;

reflecting radio frequency energy of the radio frequency interrogation signal using the appendage;

processing the radio frequency interrogation signal within the wireless identification device following the receiving;

forming a radio frequency identification signal responsive to the processing of the radio frequency interrogation signal;

outputting the radio frequency identification signal using a second antenna of the wireless identification device;

reflecting radio frequency energy of the radio frequency identification signal using the appendage;

spacing the first antenna and second antenna from the conductive layer a distance approximately equal to one quarter the wavelength of the radio frequency interrogation and identification signals using the spacer; and receiving the radio frequency identification signal using the interrogator.

57. A communication system comprising:

an interrogator configured to output and receive wireless communication signals;

a wireless communication package configured to communicate with the interrogator, the wireless communication package including: a communication device including a housing, at least one antenna borne by the housing, the antenna being operable to at least one of output and receive wireless communication signals, and communication circuitry coupled with the antenna, the communication circuitry being configured to process received wireless communication signals and form wireless communication signals; and an appendage coupled with the housing of the communication device, the appendage being configured to enhance wireless communications of the communication device; and wherein the housing comprises a substrate and an encapsulant.

58. A method of forming a wireless communication package comprising:

providing a substrate;

supporting an antenna using the substrate;

configuring the antenna to at least one of output and receive wireless communication signals;

electrically coupling wireless communication circuitry with the antenna;

forming a housing;

coupling an appendage configured to enhance wireless communications with the housing; and wherein the forming the housing comprises encapsulating the communication circuitry, the antenna and a surface of the substrate.

59. A wireless communication package comprising:

a communication device including:

a substrate;

communication circuitry borne by the substrate, the communication circuitry being configured to at least one of process and form wireless communication signals; and at least one antenna electrically coupled with the communication circuitry, the antenna being configured to at least one of receive wireless communication signals and output wireless communication signals; and an appendage comprising a spacer and a conductive layer coupled with the communication device, the appendage being configured to enhance at least one of receiving and outputting of wireless communication signals via the antenna.

60. The wireless communication package of claim 59 wherein the conductive layer forms a ground plane.

61. The wireless communication package of claim 59 wherein the conductive layer includes an outer periphery, and the antenna includes a peripheral edge received within the confines of the outer periphery of the conductive layer.

62. The wireless communication package of claim 59 wherein the spacer has a width of approximately one quarter the wavelength of the wireless communication signals.

63. A wireless communication package comprising:

a communication device including:

a housing comprising an encapsulant and a substrate;

communication circuitry borne by the substrate, the communication circuitry being configured to at least one of process and form wireless communication signals; and at least one antenna electrically coupled with the communication circuitry, the antenna being configured to at least one of receive wireless communication signals and output wireless communication signals; and an appendage coupled with the communication device, the appendage being configured to enhance at least one of receiving and outputting of wireless communication signals via the antenna.

64. A wireless communication package comprising:

a communication device including:

a housing including a substrate;

communication circuitry borne by the substrate, the communication circuitry being configured to at least one of process and form wireless communication signals; and at least one antenna electrically coupled with the communication circuitry, the antenna being configured to at least one of receive wireless communication signals and output wireless communication signals; and an appendage coupled with an entire surface of the housing of the communication device, the appendage being configured to enhance at least one of receiving and outputting of wireless communication signals via the antenna, and the area of a conductive layer of the appendage is larger than the attached surface of the housing.

65. A wireless communication package comprising:

a communication device including:

a substrate;

communication circuitry borne by the substrate, the communication circuitry being configured to at least one of process and form wireless communication signals; and a first antenna and a second antenna individually electrically coupled with the communication circuitry, the first antenna being configured to receive wireless interrogation signals and the second antenna being configured to output wireless identification signals; and an appendage coupled with the communication device, the appendage being configured to enhance at least one of receiving and outputting of wireless communication signals via the antenna.

66. A method of communicating comprising:

providing an identification device;

coupling an appendage having a spacer and a conductive layer with the identification device to increase radio frequency energy at an antenna of the identification device during communications;

outputting a wireless interrogation signal using an interrogator;

receiving the wireless interrogation signal within the identification device;

outputting a wireless identification signal using the identification device, the outputting being responsive to the receiving of the interrogation signal; and receiving the wireless identification signal using the interrogator.

67. The method of claim 66 wherein the spacer has a width of approximately one quarter the wavelength of the wireless interrogation and identification signals.

68. A method of communicating comprising:

forming a communication device including supporting communication circuitry and an antenna using a substrate;

receiving wireless communication signals using the communication device;

outputting wireless communication signals using the communication device; and after the forming, coupling an appendage having a spacer and a conductive layer with the communication device to enhance at least one of the receiving and the outputting.

69. The method of claim 68 wherein the spacer has a width of approximately one quarter the wavelength of the wireless communication signals.

* * * * *

UNITED STATES PATENT AND TRADEMARK OFFICE
CERTIFICATE OF CORRECTION

PATENT NO. : 6,133,836
DATED : October 17, 2000
INVENTOR(S) : Freddie W. Smith

It is certified that error appears in the above-identified patent and that said Letters Patent is hereby corrected as shown below:

Col. 3, Line 61: Replace "119" with --19--.

Col. 5, Line 55: Please delete "as".

Signed and Sealed this

Fifteenth Day of May, 2001

*Attest:*

NICHOLAS P. GODICI

*Attesting Officer*     *Acting Director of the United States Patent and Trademark Office*